United States Patent
Jung et al.

(10) Patent No.: US 9,436,159 B2
(45) Date of Patent: Sep. 6, 2016

(54) APPARATUS AND METHOD FOR DISPLAYING HOLOGRAPHIC THREE-DIMENSIONAL IMAGE

(71) Applicant: SAMSUNG ELECTRONICS CO., LTD., Suwon-si (KR)

(72) Inventors: Jae-eun Jung, Seoul (KR); Hong-seok Lee, Seongnam-si (KR); Seung-hoon Han, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 84 days.

(21) Appl. No.: 14/271,497

(22) Filed: May 7, 2014

(65) Prior Publication Data

US 2015/0160612 A1 Jun. 11, 2015

(30) Foreign Application Priority Data

Dec. 9, 2013 (KR) .................. 10-2013-0152609

(51) Int. Cl.
- *G03H 1/02* (2006.01)
- *G03H 1/22* (2006.01)
- *G02F 1/135* (2006.01)

(52) U.S. Cl.
CPC .......... *G03H 1/2294* (2013.01); *G02F 1/1354* (2013.01); *G03H 1/02* (2013.01); *G03H 2001/0224* (2013.01); *G03H 2224/06* (2013.01); *G03H 2225/32* (2013.01)

(58) Field of Classification Search
CPC ........ G03H 1/08; G03H 1/02; G03H 1/2294; G03H 2001/0224; G03H 2224/06; G03H 2225/32; G02F 1/00; G02F 1/1354
USPC ............ 359/1–35, 237, 250; 385/14; 257/98
See application file for complete search history.

(56) References Cited

U.S. PATENT DOCUMENTS

| | | | |
|---|---|---|---|
| 5,424,866 A * | 6/1995 | Kikinis ............ | G03H 1/22 348/771 |
| 6,097,145 A * | 8/2000 | Kastalsky ......... | G02F 1/0147 313/112 |
| RE43,642 E | 9/2012 | Feoktistov et al. | |
| 8,692,948 B2 * | 4/2014 | Park ............ | G02F 1/13338 349/12 |
| 2006/0262367 A1 * | 11/2006 | Hattori ........... | B41M 3/14 359/15 |
| 2008/0211836 A1 | 9/2008 | Stanley et al. | |
| 2013/0295555 A1 * | 11/2013 | Kimura ........... | G01N 21/21 435/5 |

(Continued)

FOREIGN PATENT DOCUMENTS

| | | |
|---|---|---|
| JP | 2913323 B2 | 6/1999 |
| JP | 2003-517161 A | 5/2003 |

(Continued)

*Primary Examiner* — Scott J Sugarman
*Assistant Examiner* — Kristina Deherrera
(74) *Attorney, Agent, or Firm* — Sughrue Mion, PLLC

(57) ABSTRACT

An apparatus for displaying a holographic three-dimensional (3D) image is provided. The apparatus includes: a holographic pattern generation unit; a spatial optical modulation device including a phase transition layer formed of a phase transition material, a phase of which is changed by a temperature. A holographic pattern generated by the holographic pattern generation unit is optically addressed on the spatial optical modulation device. The apparatus also includes a heat source for applying heat to the phase transition layer; a control unit for controlling the heat source according to holographic pattern information generated by the holographic pattern generation unit; and a reproduction light source for irradiating light for image reproduction onto the spatial optical modulation device.

14 Claims, 9 Drawing Sheets

(56) References Cited

U.S. PATENT DOCUMENTS

2014/0104664 A1* 4/2014 Lee .................. G03H 1/2294
359/9

FOREIGN PATENT DOCUMENTS

| | | |
|---|---|---|
| JP | 2008-116896 A | 5/2006 |
| JP | 2010-219207 A | 9/2010 |

* cited by examiner

APPARATUS AND METHOD FOR DISPLAYING HOLOGRAPHIC THREE-DIMENSIONAL IMAGE

RELATED APPLICATION

This application claims the benefit of Korean Patent Application No. 10-2013-0152609, filed on Dec. 9, 2013, in the Korean Intellectual Property Office, the disclosure of which is incorporated herein in its entirety by reference.

BACKGROUND

1. Field

Apparatuses and methods consistent with exemplary embodiments relate to displaying a holographic three-dimensional (3D) image.

2. Description of the Related Art

Along with the increase in demand for 3D image display apparatuses, research for a spatial optical modulator which may be employed in apparatuses for displaying a holographic 3D image has been conducted.

Compared to a method of using a binocular parallax, a method of generating a 3D image using the principle of holography causes little eye strain and forms a very natural stereoscopic image.

To obtain a desired image in a typical holography method, an interference pattern is obtained by irradiating an object with two or more light beams, e.g., a reference beam and a writing beam, and a hologram pattern is formed by projecting the interference pattern onto a material having a refractive index which varies with light. Thereafter, a stereoscopic image of the object is reproduced by irradiating the reference beam onto the hologram pattern. However, although this method may be used to obtain a single image, it is difficult to use this method to realize various images or a video.

Recently, to form a hologram pattern, methods capable of generating a pattern corresponding to a 3D image using a virtual method through computation using a computer have been proposed instead of a method directly using existing light interference. Along with the improvement in computer performance, the possibility of realizing a 3D video by using a computer generated hologram has gradually increased, and accordingly, an optical modulation device capable of reversibly writing/reproducing a generated hologram pattern is desired.

SUMMARY

One or more exemplary embodiments may provide apparatuses and methods for displaying a holographic three-dimensional (3D) image.

Additional aspects will be set forth in part in the description which follows and, in part, will be apparent from the description, or may be learned by practice of the presented embodiments.

According to an aspect of an exemplary embodiment, an apparatus for displaying a holographic three-dimensional (3D) image includes: a holographic pattern generation unit which generates holographic pattern information; a spatial optical modulation device on which a holographic pattern generated by the holographic pattern generation unit is to be optically addressed, the spatial optical modulation device including a phase transition layer formed of a phase transition material, a phase of which changes according to a temperature; a heat source which applies heat to the phase transition layer; a control unit which controls the heat source according to the holographic pattern information; and a reproduction light source which irradiates light for image reproduction onto the spatial optical modulation device.

The heat source may be a laser light source.

The phase transition material may be a material that undergoes a Mott transition.

The phase transition material may include a material selected from a group consisting of vanadium dioxide ($VO_2$), vanadium trioxide ($V_2O_3$), europium oxide (EuO), manganese oxide (MnO), cobalt oxide (CoO), cobalt dioxide ($CoO_2$), lithium cobalt dioxide ($LiCoO_2$), calcium ruthenium oxide ($Ca_2RuO_4$), strontium lawrencium oxide ($SrLrO_4$), and copper chloride (CuCl).

The spatial optical modulation device may further include a first substrate on which the phase transition layer is formed.

The phase transition layer may be patterned onto a plurality of regions that are separated from one other.

Spaces between the plurality of regions may be vacuum-sealed.

A second substrate may be formed on the phase transition layer, and a sealing member for vacuum-sealing the space between the plurality of regions may be formed between the first substrate and the second substrate.

The first substrate on which the phase transition layer patterned onto the plurality of regions is formed may be arranged in a vacuum structure.

An optical absorption layer may be formed between the first substrate and the phase transition layer.

The optical absorption layer may be formed of a black polymer and a plurality of metal nanostructures dispersed throughout the black polymer.

The metal nanostructures each may have a spherical nanoparticle shape.

A diameter of the spherical nanoparticle shape may be the same as a thickness of the optical absorption layer.

The metal nanostructures each may have a nanorod or nanowire shape.

The metal nanostructures each may have a length that is equal to a distance between the first substrate and the phase transition layer, and a longitudinal direction of the nanorod may be arranged in a direction oriented toward the phase transition layer.

A reflective layer may be formed between the first substrate and the phase transition layer.

A reflective layer may be formed between the optical absorption layer and the phase transition layer.

The spatial optical modulation device may further include a liquid crystal layer.

The spatial optical modulation device may include: the first substrate; a first electrode layer formed on the first substrate; the phase transition layer formed on the first electrode layer; the liquid crystal layer formed on the phase transition layer; a second electrode layer formed on the liquid crystal layer; and the second substrate formed on the second electrode layer.

The phase transition layer may be patterned onto a plurality of regions that are separated from one other.

The apparatus may further include a sensor for measuring an ambient temperature of the phase transition layer.

The control unit may store therein a cooling curve function of the phase transition material forming the phase transition layer and adjust the intensity of the heat source according to the ambient temperature measured by the sensor.

According to an aspect of another exemplary embodiment, a method of displaying a holographic three-dimensional (3D) image includes: applying heat to a spatial optical modulation device having a phase transition layer formed of a phase transition material, according to holographic pattern information, so that the phase transition layer is heated to a phase transition temperature or more; and irradiating reproduction light on the spatial optical modulation device.

BRIEF DESCRIPTION OF THE DRAWINGS

These and/or other exemplary aspects and advantages will become apparent and more readily appreciated from the following description of the embodiments, taken in conjunction with the accompanying drawings in which.

DETAILED DESCRIPTION

Figure 1A:
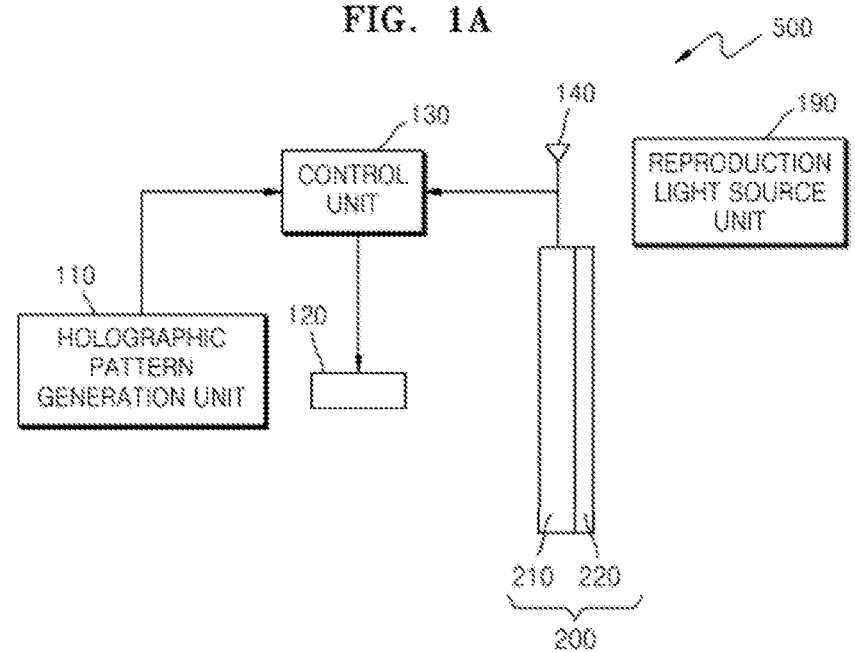
FIGS. 1A and 1B are block diagrams of an apparatus for displaying a holographic three-dimensional (3D) image, respectively showing a state in which phase transition does not occur in a phase transition layer and a state in which phase transition occurs in the phase transition layer to thereby form a holographic pattern, according to an exemplary embodiment.

Exemplary embodiments are illustrated in the drawings and described in detail herein. The exemplary embodiments may allow various kinds of change or modification and various changes in form. Advantages and features of the embodiments and a method for achieving them will be clear with reference to the accompanying drawings. The exemplary embodiments may be embodied in many different forms and should not be construed as being limited to the descriptions set forth herein.

Reference will now be made in detail to exemplary embodiments which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

It will be understood that although the terms "first", "second", etc. may be used herein to describe various components, these components should not be limited by these terms. These components are only used to distinguish one component from another.

As used herein, the singular forms "a," "an" and "the" are intended to include the plural forms as well, unless the context clearly indicates otherwise.

It will be further understood that the terms "comprises" and/or "comprising" used herein specify the presence of stated features or components, but do not preclude the presence or addition of one or more other features or components.

It will be understood that when a layer, region, or component is referred to as being "formed on," another layer, region, or component, it can be directly or indirectly formed on the other layer, region, or component. That is, for example, intervening layers, regions, or components may be present.

Sizes of elements in the drawings may be exaggerated for convenience of explanation. In other words, since sizes and thicknesses of components in the drawings are arbitrarily illustrated for convenience of explanation, the following embodiments are not limited thereto.

As used herein, the term "and/or" includes any and all combinations of one or more of the associated listed items.

Figure 1B:
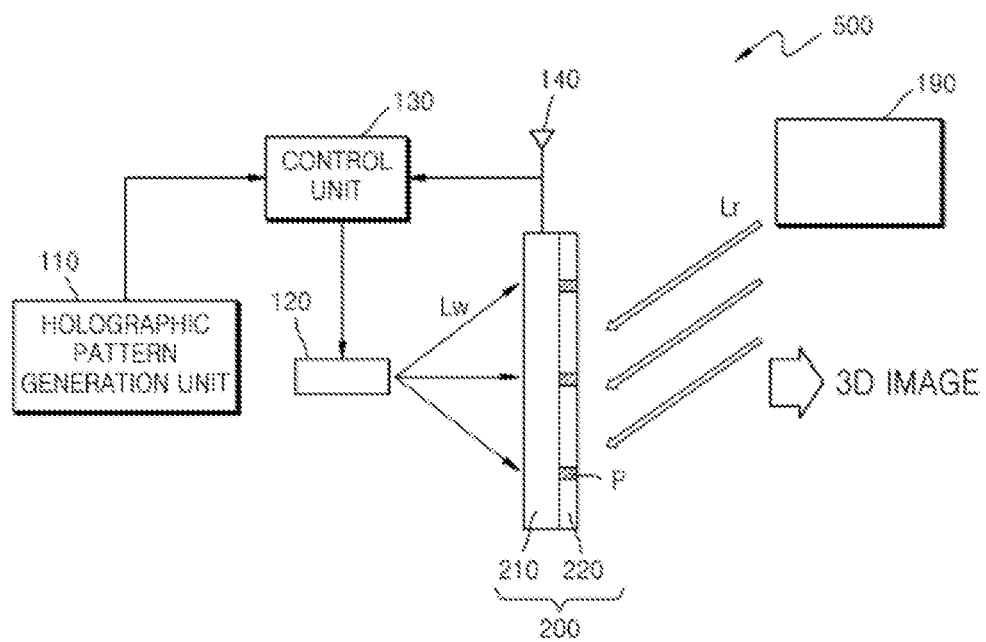

FIGS. 1A and 1B are block diagrams of an apparatus 500 for displaying a holographic 3D image, respectively showing a state in which phase transition does not occur in a phase transition layer 220 and a state in which phase transition occurs in the phase transition layer 220 to thereby form a holographic pattern P, according to an exemplary embodiment.

The apparatus 500 includes a holographic pattern generation unit 110, a spatial optical modulation device 200 which includes the phase transition layer 220 formed of a phase transition material of which a phase changes according to temperature and which optically addresses the holographic pattern P generated by the holographic pattern generation unit 110, a heat source 120 for applying heat to the phase transition layer 220, a control unit 130 for controlling the heat source 120 according to holographic pattern information generated by the holographic pattern generation unit 110, and a reproduction light source unit 190 for irradiating light for image reproduction to the spatial optical modulation device 200. The holographic pattern generation unit 110, the control unit 130, and the reproduction light source unit may each comprise one or more computer processors or other computer circuitry.

The holographic pattern generation unit 110 generates the holographic pattern P containing the 3D image information using a virtual method. In other words, a detailed form of an interference pattern which may be obtained by irradiating a reference beam and a writing beam onto an object is calculated by a computer simulation. As the performance of a computer increases, a holographic pattern containing various pieces of image or video information may be formed.

The spatial optical modulation device 200 is provided to reversibly record or reproduce the holographic pattern P formed by the holographic pattern generation unit 110. The spatial optical modulation device 200 employs a phase transition material in which a phase transition occurs based on a temperature and may have, for example, a structure in which the phase transition layer 220 is formed on a first substrate 210.

The first substrate 210 is a base for forming the phase transition layer 220, and a substrate of any of various materials may be used for the first substrate 210. For example, the first substrate 210 may be formed of a light-transmissive material or a material having a high heat conductivity by which heat may be easily transferred to the phase transition layer 220.

The phase transition layer 220 may be formed of a material in which a phase transition occurs based on a temperature. The material is a material that undergoes a Mott transition, in which an electrical characteristic of the material changes by phase transition, such as insulator-metal transition, semiconductor-metal transition, semiconductor-insulator transition, or the like, or a magnetic characteristic of the material changes by phase transition, such as magnetic-nonmagnetic transition or the like. The material may correspond to, for example, vanadium dioxide ($VO_2$), vanadium trioxide ($V_2O_3$), titanium (Ti)-doped $VO_2$, Ti-doped $V_2O_3$, europium oxide (EuO), manganese oxide (MnO), cobalt oxide (CoO), cobalt dioxide ($CoO_2$), lithium cobalt dioxide ($LiCoO_2$), calcium ruthenium oxide ($Ca_2RuO_4$), strontium (Sr)-doped $Ca_2RuO_4$, strontium lawrencium oxide ($SrLrO_4$), copper chloride (CuCl), or the like. When a temperature that is a phase transition temperature or greater is induced in a particular location of the material, a material characteristic at the location may vary, and thus, an optical characteristic of the material may vary, thereby forming the holographic pattern P on the phase transition layer 220.

In order to realize a video with holographic 3D images, a writing time is also important, and since a phase transition time of Mott transition is in the picoseconds to femtoseconds, a writing time is very short even for gigabytes of data. In addition, high resolution holographic 3D images may be realized using the phase transition material. When phase transition occurs based on a temperature, since a variation width of the phase transition occurring at a temperature that is equal to or higher than the phase transition temperature is very narrow, even though the writing beam, that is, a beam irradiated by the heat source 120 to heat the phase transition layer 220, has a Gaussian distribution, high resolution holographic 3D images may be realized. Accordingly, a minute pattern that is less than a beam spot size may be formed on the phase transition layer 220 by adjusting the thermal energy of the beam that is irradiated onto the phase transition layer 220.

The heat source 120 may apply heat so as to form the holographic pattern P on the phase transition layer 220. For the heat source 120, a laser light source may be used, and the laser light source irradiates laser beams on the phase transition layer 220 so that the temperature of a particular location of the phase transition layer 220 is raised to a particular temperature, thereby forming the holographic pattern P generated by the holographic pattern generation unit 110. The phase transition layer 220 is heated with a preset heat intensity distribution so as to form a pattern corresponding to a 3D image at every local region of the phase transition layer 220. To this end, the laser light source used for the heat source 120 may be configured so that the intensity and direction of the laser light can scan the phase transition layer 220 under control of the control unit 130. Alternatively, an array of a plurality of laser light sources may be used so that a desired temperature distribution for forming the holographic pattern P is obtained quickly on the whole area of the phase transition layer 220.

The reproduction light source unit 190 may reproduce a 3D image contained in the holographic pattern P formed on the phase transition layer 220. The reproduction light source unit 190 is provided to irradiate, as reproduction light Lr, light having the same properties, e.g., the same wavelength and phase, as the reference beam used in the computer simulation for generating the holographic pattern P by using the holographic pattern generation unit 110. The reproduction light source unit 190 may have a configuration capable of quickly scanning the spatial optical modulation device 200 or may be formed having a surface light source device so that the reproduction light Lr can be irradiated simultaneously onto the whole area of the spatial optical modulation device 200.

The apparatus 500 may further include a sensor 140 for measuring an ambient temperature of the phase transition layer 220. A cooling speed of the phase transition layer 220 is associated with the ambient temperature. For example, the apparatus 500 may store therein a cooling curve function of the phase transition material forming the phase transition layer 220 and adjust the intensity of the heat source 120 in consideration of the temperature measured by the sensor 140.

Figure 2:
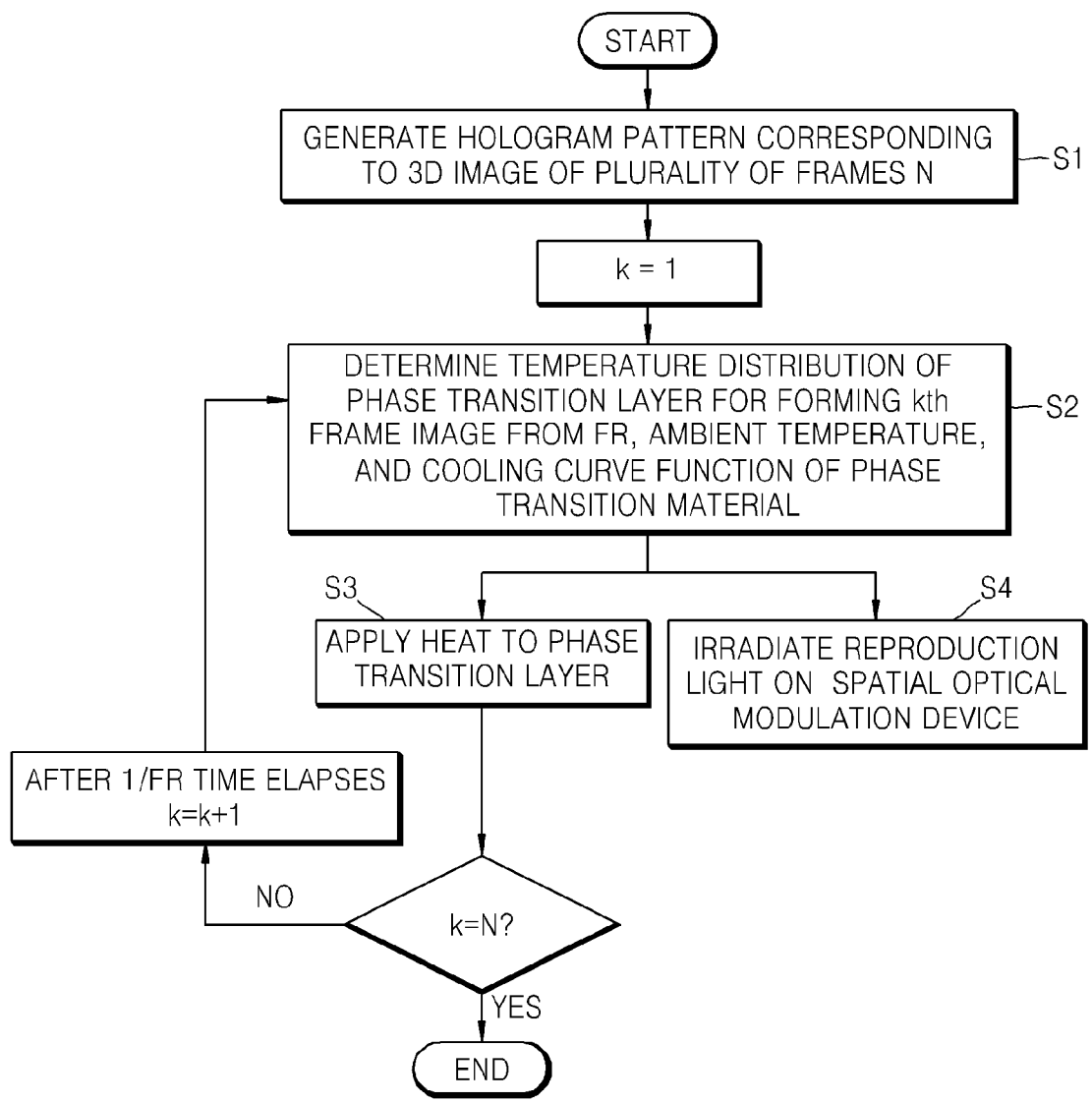
FIG. 2 is a flowchart of a method of displaying a holographic 3D image, according to an exemplary embodiment.

FIG. 2 is a flowchart of a method of displaying a holographic 3D image, according to an embodiment of the present invention.

The method includes applying heat to a spatial optical modulation device having a phase transition layer formed of a phase transition material, according to holographic pattern information, so that the phase transition layer is heated to a phase transition temperature or more and irradiating reproduction light on the spatial optical modulation device.

The apparatus 500 shown in FIGS. 1A and 1B is an illustrative structure for implementing the method, and the method will now be described in detail with reference to FIGS. 1A and 1B.

The holographic pattern generation unit 110 forms a holographic pattern corresponding to a 3D image to be displayed. For example, a hologram pattern corresponding to a 3D image having a plurality of frames N is generated in operation S1. In detail, a frame rate FR expressed as a number of frames per second for displaying a video and a total number N of frames are determined in operation S1. Operation S1 is performed through a computer simulation, and a calculation result is stored.

The control unit 130 determines a temperature distribution of the phase transition layer 220 that is necessary for forming each frame image and controls the heat source 120 on the basis of the determined temperature distribution. For example, the temperature distribution of the phase transition layer 220 is determined from the frame rate FR, an ambient temperature, and a cooling curve function of a phase transition material forming the phase transition layer 220 in operation S2.

For example, when the phase transition temperature is 70° C., and the cooling curve function of the phase transition material has a cooling speed of 1° C./msec, heat is applied to the phase transition layer 220 so that the temperature of the phase transition material cools to 101° C., which is 31° C. higher than the phase transition temperature. In this case, the temperature of the phase transition material becomes 69° C. after 32 msec have elapsed following phase transition, and thus, once the temperature of the phase transition material has cooled to 69° C., the phase transition material returns to an original phase. That is, since a holographic pattern corresponding to a corresponding image is maintained only for 32 msec, an operation of about 30 Hz may be performed.

When a holographic pattern is generated, after the frame rate FR is determined, an ambient temperature is measured, and a cooling temperature per second starting from the measured ambient temperature is derived from the cooling curve function of the phase transition material. Accordingly, a temperature T of the phase transition layer 220 may be defined as below.

$$T=\text{(phase transition temperature)}+(1/FR)*\text{(cooling temperature per second)}.$$

In this manner, when a temperature which is desired for an area formed of all local regions in the phase transition layer 220, i.e., a temperature distribution, is determined, heat is applied to the phase transition layer 220 on the basis of the temperature distribution in operation S3.

The calculation method described above is illustrative, and various factors for more accurate calculation may be stored in the control unit 130 together with the cooling curve function of the phase transition material, and a temperature distribution to be formed in the phase transition layer 220 may be calculated using the various factors and the cooling curve function of the phase transition material.

A laser light source used for the heat source 120 irradiates a writing beam Lw, which is light for heating the phase transition layer 220, thereby forming a corresponding holographic pattern P on the phase transition layer 220. The reproduction light source unit 190 irradiates reproduction light Lr on the spatial optical modulation device 200 in operation S4, and a 3D image is reproduced due to interference between the reproduction light Lr and the holographic pattern P.

As described above, the temperature distribution of the phase transition layer 220 is set to become lower than the phase transition temperature when a time corresponding to inverse of the frame rate, 1/FR elapses. Therefore, the holographic pattern P formed on the phase transition layer 220 disappears when an elapsed timed after laser light irradiation is greater than 1/FR since the temperature of the phase transition layer 220 is lower than the phase transition temperature and the phase transition material of the phase transition layer 220 returns to an original phase. Accordingly, a holographic pattern corresponding to a next frame image may be formed.

In order to form the holographic pattern corresponding to the next frame image, a temperature distribution of the phase transition layer 220 corresponding to the holographic pattern containing the next frame image is determined in operation S2, and heat is applied to the phase transition layer 220 according to the temperature distribution of the phase transition layer 220 in operation S3. A temperature distribution of the phase transition layer 220 for forming holographic patterns corresponding to a plurality of frame images may be calculated and stored in operation S1, in advance of generating the hologram pattern corresponding to the 3D image corresponding to the plurality of frames, and the heat source 120 may be controlled according to the temperature distribution of the phase transition layer 220 in operation S3 by applying heat to the phase transition layer 220.

FIGS. 3 to 10 illustrate various structures of a spatial optical modulation device which may be employed in the apparatus 500 of FIG. 1, according to exemplary embodiments.

Figure 3:
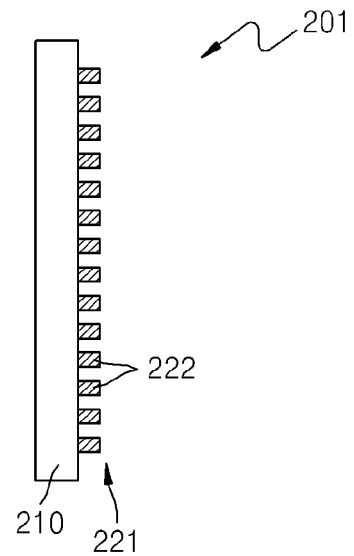
FIGS. 3 to 10 illustrate various structures of a spatial optical modulation device which may be employed in the apparatus of FIGS. 1A and 1B, according to exemplary embodiments.
Figure 4:
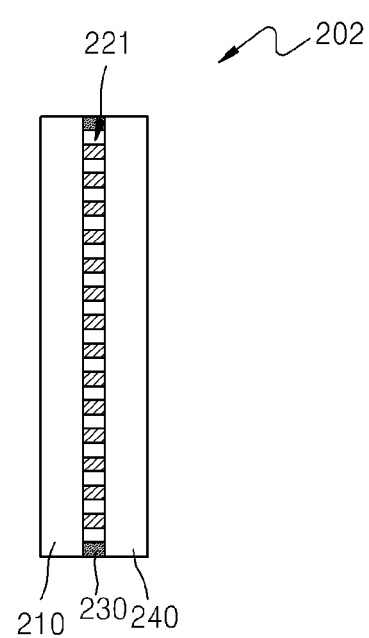
Figure 5:
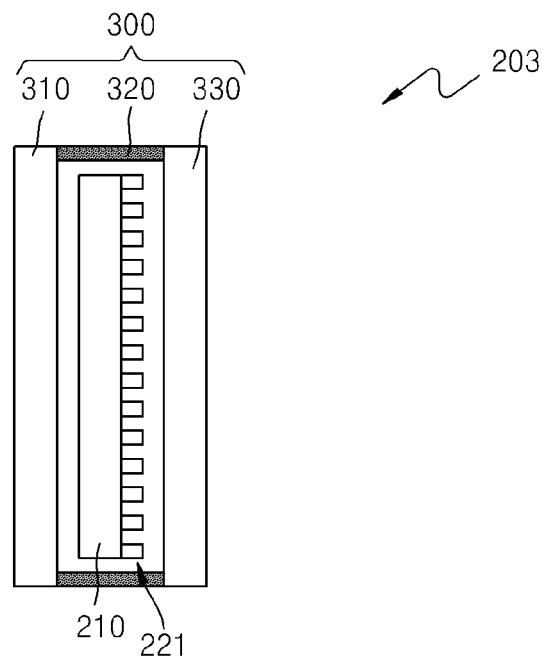

FIGS. 3 to 5 illustrate structures that are relatively effective for obtaining a minute pattern so as to increase resolution.

Referring to FIG. 3, a spatial optical modulation device 201 includes the first substrate 210 and a phase transition layer 221 formed on the first substrate 210. The phase transition layer 221 is patterned onto a plurality of regions 222 that are separated from each other.

The phase transition layer 221 may be formed by depositing a phase transition material to form a thin-film form as shown in FIG. 1A and using an etching process. Alternatively, the phase transition layer 221 may be formed using a nanowire growth method involving a vertical growth method. The diameter of each region 222 may be on the order of hundreds nanometers or less. In addition, a gap between the regions 222 may be on the order of several nanometers to hundreds of nanometers.

The structure of the phase transition layer 221 as illustrated in FIG. 3 may be used to form a relatively accurate holographic pattern by reducing an influence from adjacent regions when local regions of the phase transition layer 221 are heated with different intensities of heat. Since the structure has poor heat transfer between adjacent regions 222 due to an air layer between the adjacent regions 222, when the writing beam Lw irradiated by the heat source 120 is irradiated onto a particular part of the phase transition layer 221, heat may be prevented from spreading along the phase transition layer 221 and widening a pattern.

Referring to FIG. 4, a spatial optical modulation device 202 includes the first substrate 210, the phase transition layer 221 patterned onto the plurality of regions 222, a second substrate 240 on the phase transition layer 221, and a sealing member 230 formed between the first substrate 210 and the second substrate 240 around the regions of the phase transition layer.

The structure of the phase transition layer 221 as illustrated in FIG. 4 may increase an insulation effect between the plurality of regions 222 by vacuum-sealing a space between the plurality of regions 222. Since heat transfer between adjacent regions is blocked in a vacuum state, when local regions of the phase transition layer 221 are heated with different intensities of heat, adjacent regions may be further prevented from influencing one another.

Referring to FIG. 5, a spatial optical modulation device 203 includes the first substrate 210 on which the phase transition layer 221 patterned onto the plurality of regions 222 is formed, and which is arranged in a vacuum structure 300. The vacuum structure 300 may be formed with two substrates 310 and 330 separated from each other and a sealing member 320 surrounding the periphery between the two substrates 310 and 330. However, the spatial optical modulation device 203 is not limited to the structure shown in FIG. 5, and the vacuum structure 300 may be modified to various forms of structures capable of forming a vacuum therein.

FIGS. 6 to 9 illustrate spatial optical modulation devices 204, 205, 207, and 208 employing an optical absorption layer together with the phase transition layer 220, respectively.

Figure 6:
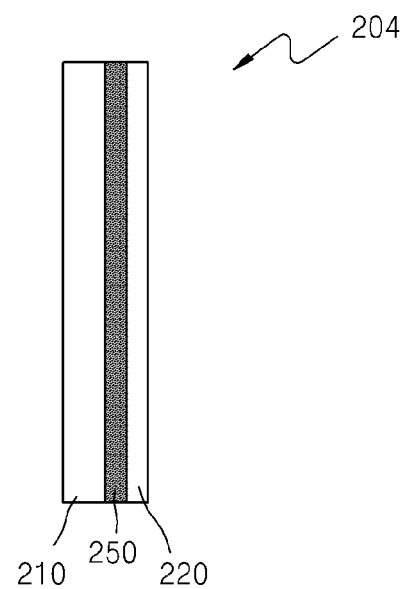

Referring to FIG. 6, the spatial optical modulation device 204 includes the first substrate 210, an optical absorption layer 250, and the phase transition layer 220. The optical absorption layer 250 may block the writing beam Lw from the heat source 120, such as a laser light source, from being transferred to a viewer. Although the optical absorption layer 250 is present, the writing beam Lw from the heat source 120 should be able to heat the phase transition layer 220. For the optical absorption layer 250, a carbon-group material may be used, and alternatively, a polymer in which a black pigment or a black dye is mixed may be used.

Figure 7:
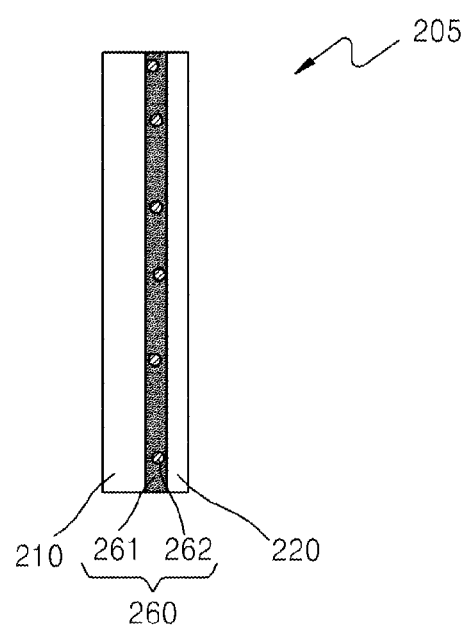
Figure 8:
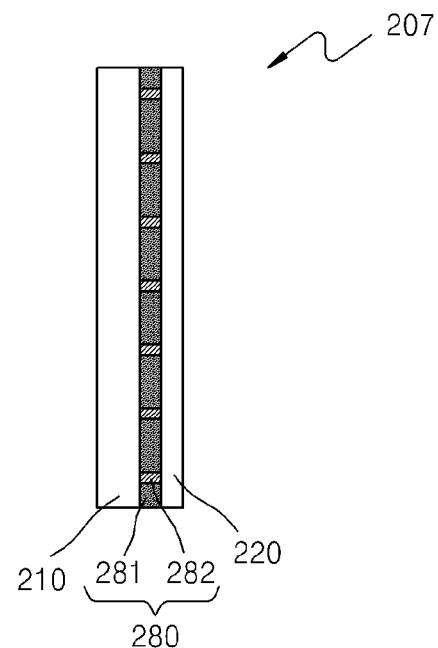

FIGS. 7 and 8 illustrate optical absorption layers 260 and 280 including metal nanostructures.

Referring to FIG. 7, the spatial optical modulation device 205 includes the first substrate 210, the optical absorption layer 260, and the phase transition layer 220. The optical absorption layer 260 is formed by mixing metal nanostructures 262 of a spherical particle shape with a black polymer 261. The black polymer 261 is formed of a polymer material mixed with a black dye or pigment.

The structure of the spatial optical modulation device 205 as illustrated in FIG. 7 is such that the transfer of heat from the heat source 120 is only in a vertical direction, i.e., a direction crossing the optical absorption layer 260 and orienting to the phase transition layer 220, and the transfer of heat in a horizontal direction is minimized. According to this heat transfer pattern, heat may not be spread in the horizontal direction, thereby obtaining a relatively minute pattern. As an example for implementing the minute pattern, the spatial optical modulation device 205 of the present embodiment employs the optical absorption layer 260 in which the metal nanostructures 262 having a good thermal conductivity are mixed with the black polymer 261. The diameter of each of the metal nanostructures 262 may be similar to the thickness of the optical absorption layer 260, and accordingly, a thermal conductivity of a thickness direction may be relatively higher than a thermal conductivity of another direction.

Referring to FIG. 8, the spatial optical modulation device 207 includes the first substrate 210, the optical absorption layer 280, and the phase transition layer 220. The optical absorption layer 280 is formed by mixing metal nanostructures 282 of a nanorod or nanowire shape with a black polymer 281.

The metal nanostructures 282 have a length that is the same as a distance between the first substrate 210 and the phase transition layer 220, i.e., a length that is the same as the thickness of the optical absorption layer 280, and are arranged in a direction oriented away from the first substrate 210 and towards the phase transition layer 220.

As a method of forming the optical absorption layer 280 of the structure described above, a method of forming vertical holes in the black polymer 281 by etching or the like and filling a metallic material in the vertical holes may be used. Alternatively, a method of vertically growing the metal nanostructures 282 in a nanowire or nanorod shape and filling a region between the metal nanostructures 282 with a material of the black polymer 281 may be used.

Since the optical absorption layer 280 having the structure described above transfers heat well only in a longitudinal direction of nanorods, i.e., a direction crossing the optical absorption layer 280, a relatively minute pattern may be formed on the phase transition layer 220.

Figure 9:
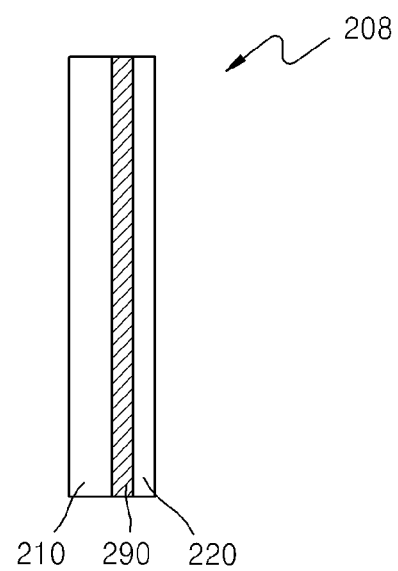

Referring to FIG. 9, the spatial optical modulation device 208 includes the first substrate 210, the reflective layer 290, and the phase transition layer 220. The reflective layer 290 is provided to increase the efficiency of projecting, towards a viewer, a 3D image reproduced by interference between the reproduction light Lr and a holographic pattern P formed on the phase transition layer 220 when the reproduction light Lr is irradiated on the spatial optical modulation device 208. For the reflective layer 290, a metal thin film may be used.

Figure 10:
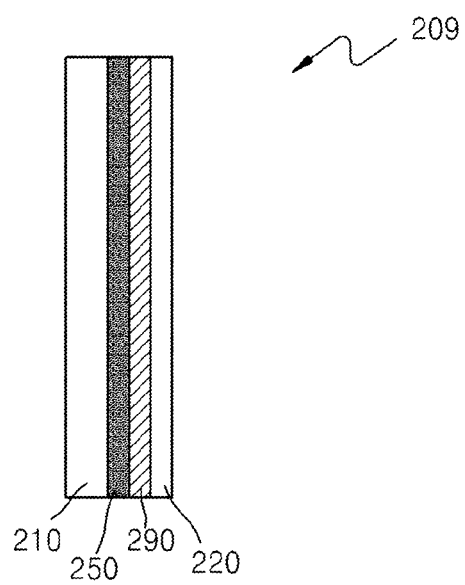

Referring to FIG. 10, a spatial optical modulation device 209 includes the first substrate 210, the optical absorption layer 250, the reflective layer 290, and the phase transition layer 220.

The spatial optical modulation device 209 of the present embodiment employs both the optical absorption layer 250 and the reflective layer 290 so as to prevent a writing beam irradiated by the heat source 120 from arriving at a viewer and to transfer well to the viewer a 3D image reproduced by interference between reproduction light and a holographic pattern.

Although the phase transition layer 220 in the spatial optical modulation devices 204, 205, 207, 208, and 209 of FIGS. 6 to 10 is shown in a thin film form without a pattern, the shown phase transition layer 220 is only illustrative and may be modified to the phase transition layer 221 patterned onto a form having the plurality of regions 222 as shown in FIG. 3. In this case, the phase transition layer 220 may be modified to a form having a vacuum-sealed space between the plurality of regions 222 as shown in FIG. 4 or 5.

Figure 11A:
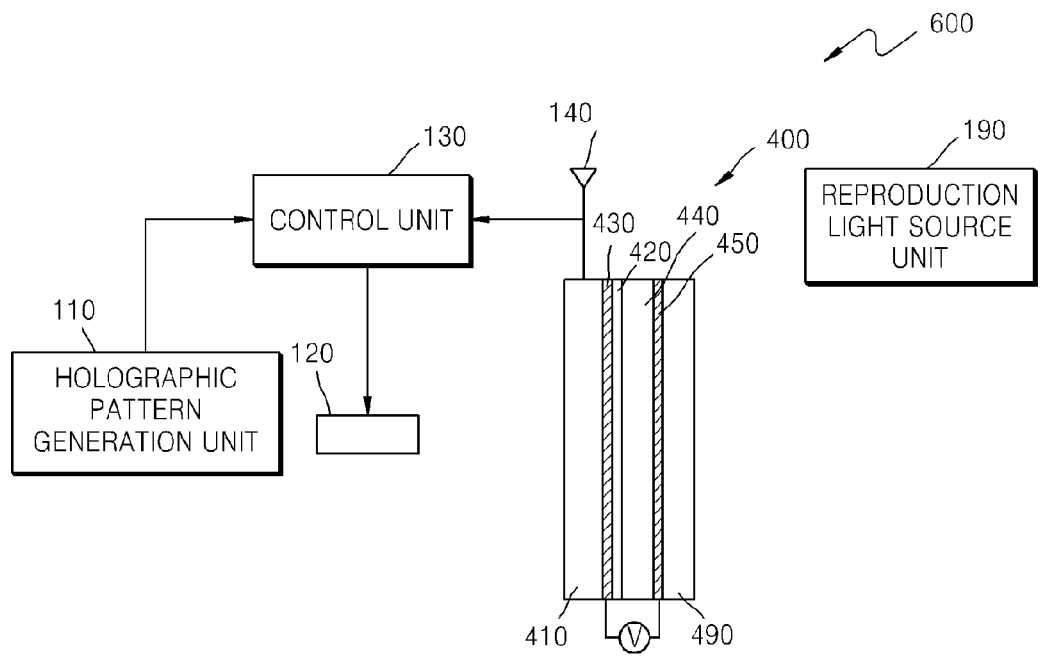
FIGS. 11A and 11B are block diagrams of an apparatus for displaying a holographic 3D image, respectively showing a state in which phase transition does not occur in a phase transition layer and a state in which phase transition occurs in the phase transition layer to thereby form a holographic pattern on a liquid crystal layer, according to another exemplary embodiment.
Figure 11B:
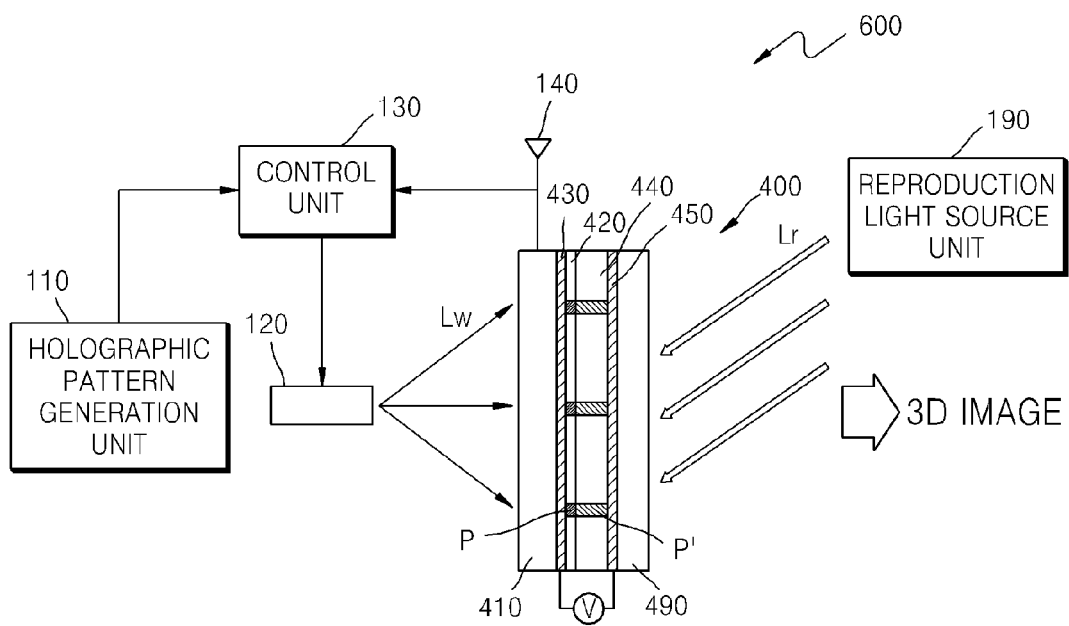

FIGS. 11A and 11B are block diagrams of an apparatus 600 for displaying a holographic 3D image, respectively showing a state in which phase transition does not occur in a phase transition layer 420 and a state in which phase transition occurs in the phase transition layer 420 to thereby form a holographic pattern P on a liquid crystal layer 440, according to another exemplary embodiment.

The apparatus 600 according to the present embodiment differs from the apparatus 500 of FIGS. 1A and 1B in that a spatial optical modulation device 400 includes the phase transition layer 420 and the liquid crystal layer 440 wherein the holographic pattern P generated by the holographic pattern generation unit 110 is optically addressed on the liquid crystal layer 440.

When phase transition occurs in a phase transition material forming the phase transition layer 420 due to heat applied by the heat source 120, an electrical characteristic of the phase transition material changes. That is, phase transition from a semiconductor to a metal, from an insulator to a metal, or the like, causes a change in an electrical resistance. Due to the above electrical characteristics, an electric field distribution in the liquid crystal layer 440 may be adjusted according to a phase transition phenomenon in the material. Since liquid crystal molecules are aligned along a direction of an electric field, a refractive index distribution may be formed in the liquid crystal layer 440 according to the electric field distribution to thereby form a desired holographic pattern.

In detail, the spatial optical modulation device 400 includes a first substrate 410, a first electrode layer 430 formed on the first substrate 410, the phase transition layer 420 formed on the first electrode layer 430, the liquid crystal layer 440 formed on the phase transition layer 420, a second electrode layer 450 formed on the liquid crystal layer 440, and a second substrate 490 formed on the second electrode layer 450. The first substrate 410 and the second substrate 490 are base members for forming the liquid crystal layer 440 by injecting and sealing liquid crystal molecules therebetween, and both or one of the first substrate 410 and the second substrate 490 may be omitted.

The first electrode layer 430 and the second electrode layer 450 are each formed of a conductive material, and the second electrode layer 450 may be formed of a transparent electrode material so that the reproduction light Lr emitted from the reproduction light source unit 190 is transmitted to the liquid crystal layer 440. The first electrode layer 430 may be formed of a metallic material or a transparent conductive material, and if the first electrode layer 430 is formed of a metallic material, the first electrode layer 430 may function as a reflective layer as described with reference to FIG. 9.

The phase transition layer 420 is formed of a phase transition material, and the phase transition materials illustrated in the description of the apparatus 500 shown in FIGS. 1A and 1B, According to the present embodiment, a phenomenon by which the electrical property of the phase transition layer 420 changes in accordance with phase transitions in the material is used, and a temperature distribution to be formed across the phase transition layer 420 by the heat source 120 is determined in consideration of the holographic pattern P to be formed on the liquid crystal layer 440.

In detail, the liquid crystal molecules forming the liquid crystal layer 440 are aligned along a direction of an electric field when the electric field is formed in the liquid crystal layer 440 by a voltage applied between the first electrode layer 430 and the second electrode layer 450. The liquid crystal molecules have a property according to which refractive indexes thereof in a long-axis direction and a short-axis direction are different from each other, and if a degree of alignment of the liquid crystal molecules varies according to a magnitude of the electric field, a refractive index distribution in the liquid crystal layer 440 varies. That is, if local regions in the liquid crystal layer 440 have electric fields different in magnitude than one another, a refractive index distribution in the liquid crystal layer 440 may be formed to thereby form a desired holographic pattern. According to the present embodiment, the electrical property, e.g., the property that an electrical resistance varies, of the phase transition layer 420 is used to form a refractive index distribution in the liquid crystal layer 440. Even though a constant voltage is applied between the first electrode layer 430 and the second electrode layer 450, when a temperature distribution formed in the phase transition layer 420 by the heat source 120 becomes equal to or greater than the phase transition temperature, an electrical resistance of a location where phase transition has occurred changes, and an electric field in a region of the liquid crystal layer 440 corresponding to the location differs from an electric field in the other region. As shown in FIG. 11B as an example, when a certain phase transition pattern P1 is formed on the phase transition layer 420, an alignment of liquid crystal molecules in a region of the liquid crystal layer 440 at a location corresponding to the phase transition pattern P1 becomes distinguished from an alignment in the other region, and a holographic pattern P is formed on the liquid crystal layer 440.

When the reproduction light source unit 190 irradiates the reproduction light Lr onto the liquid crystal layer 440 on which the holographic pattern P is formed, a 3D image is reproduced.

The apparatus 600 according to the present embodiment may also display a video in the method described with reference to FIG. 2. However, a detailed calculation and control of the heat source 120 performed by the control unit 130 may differ from the embodiment of FIGS. 1A and 1B in that, in the method described with reference to FIG. 2, a temperature distribution is determined in consideration of a change in an electrical property of the phase transition layer 420 so that a holographic pattern P corresponding to a 3D image of a corresponding frame is formed on the liquid crystal layer 440.

Figure 12:
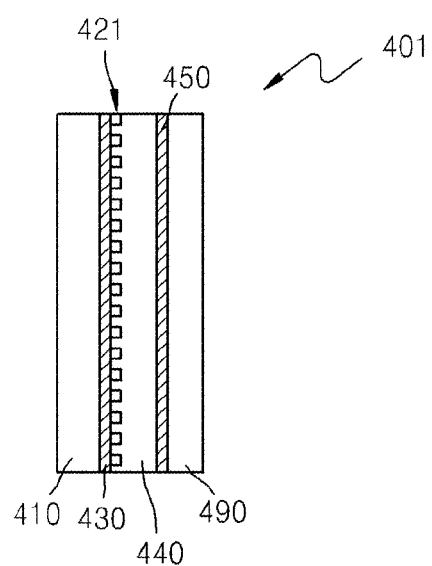
FIG. 12 illustrates a spatial optical modulation device which may be employed in the apparatus of FIGS. 11A and 11B, according to another exemplary embodiment.

FIG. 12 illustrates a spatial optical modulation device 401 which may be employed in the apparatus 600 of FIG. 11, according to another exemplary embodiment.

The spatial optical modulation device 401 differs from the spatial optical modulation device 400 of FIGS. 11A and 11B in that the spatial optical modulation device 401 includes a phase transition layer 421 patterned onto a plurality of regions. The structure of the spatial optical modulation device 401 as illustrated in FIG. 12 may form a pattern having a relatively high resolution by reducing the transfer of heat from local regions to adjacent regions when local regions of the phase transition layer 421 are heated as described with reference to FIG. 3.

The structures of the optical absorption layers 250, 260, and 280 and the reflective layer 290 described with reference to FIGS. 6 to 10 may be selectively or together employed in the structures of the spatial optical modulation devices 400 and 401 employed in FIGS. 11A, 11B, and 12.

As described above, according to the one or more of the above-described exemplary embodiments, an apparatus and method for displaying a holographic 3D image may write and reproduce an inverse pattern of various 3D images by employing a phase transition layer formed of a material of which phase transition occurs according to a temperature in a spatial optical modulation device and applying heat corresponding to a hologram pattern generated by a computer to the phase transition layer.

The phase transition material has a very short phase transition time and also has a short time of returning from a transitioned phase to an original phase, and thus, the apparatus for displaying a holographic 3D image may display a 3D video.

In addition, other exemplary embodiments can also be implemented through computer-readable code/instructions in/on a medium, e.g., a computer-readable medium, to control at least one processing element to implement any of the above described exemplary embodiments. The medium can correspond to any non-transitory medium/media permitting the storage and/or transmission of the computer-readable code.

The computer-readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs). Thus, the medium may be a non-transitory medium according to one or more exemplary embodiments. The media may also be used in conjunction with a distributed network, so that the computer-readable code is stored/transferred and executed in a distributed fashion. Furthermore, the processing element could include a processor or a computer processor, and processing elements may be distributed and/or included in a single device.

It should be understood that the exemplary embodiments described herein should be considered in a descriptive sense only and not for purposes of limitation. Descriptions of features or aspects within each embodiment should typically be considered as available for other similar features or aspects in other embodiments.

While one or more exemplary embodiments have been described with reference to the figures, it will be understood by those of ordinary skill in the art that various changes in form and details may be made therein without departing from the spirit and scope of the present invention as defined by the following claims.

What is claimed is:

1. An apparatus for displaying a holographic three-dimensional image, the apparatus comprising:
a holographic pattern generation unit which generates holographic pattern information;
a spatial optical modulation device comprising a phase transition layer formed of a phase transition material, wherein a phase of the phase transition material changes according to a temperature thereof;
a heat source which applies heat to the phase transition layer;
a control unit which controls the heat source according to the holographic pattern information;
a reproduction light source which irradiates light onto the spatial optical modulation device; and
an optical absorption layer formed between a first substrate and the phase transition layer, wherein a plurality of metal nanostructures are dispersed throughout the optical absorption layer,
wherein each of the metal nanostructures has a shape of one of a nanorod and a nanowire,
wherein a length of each of the metal nanostructures is the same as a thickness of the optical absorption layer, and wherein each of the metal nanostructures is arranged in a direction oriented from the first substrate to the phase transition layer.

2. The apparatus of claim 1, wherein the heat source is a laser light source.

3. The apparatus of claim 1, wherein the phase transition material is a material that undergoes a Mott transition.

4. The apparatus of claim 3, wherein the phase transition material includes a material selected from a group consisting of vanadium dioxide ($VO_2$), vanadium trioxide ($V_2O_3$), europium oxide (EuO), manganese oxide (MnO), cobalt oxide (CoO), cobalt dioxide ($CoO_2$), lithium cobalt dioxide ($LiCoO_2$), calcium ruthenium oxide ($Ca_2RuO_4$), strontium lawrencium oxide ($SrLrO_4$), and copper chloride (CuCl).

5. The apparatus of claim 1, wherein the phase transition layer is patterned into a plurality of regions that are separated from one other.

6. The apparatus of claim 5, further comprising a vacuum structure, wherein the first substrate is disposed in the vacuum structure.

7. The apparatus of claim 5, further comprising a reflective layer formed between the first substrate and the phase transition layer.

8. The apparatus of claim 1, further comprising:
a second substrate formed on the phase transition layer, and
a sealing member, wherein a space is formed around the plurality of regions and defined by the first substrate, the second substrate, and the sealing member, and wherein the space is vacuum sealed.

9. The apparatus of claim 1, wherein the optical absorption layer comprises a black polymer and the plurality of metal nanostructures dispersed throughout the black polymer.

10. The apparatus of claim 1, further comprising a reflective layer formed between the optical absorption layer and the phase transition layer.

11. The apparatus of claim 1, further comprising a sensor configured to measure an ambient temperature of the phase transition layer.

12. The apparatus of claim 11, wherein the control unit stores therein a cooling curve function of the phase transition material and adjusts an intensity of the heat source according to the ambient temperature measured by the sensor.

13. An apparatus for displaying a holographic three-dimensional image, the apparatus comprising:
a holographic pattern generation unit which generates holographic pattern information;
a spatial optical modulation device comprising a phase transition layer formed of a phase transition material, wherein a phase of the phase transition material changes according to a temperature thereof;
a heat source which applies heat to the phase transition layer;
a control unit which controls the heat source according to the holographic pattern information; and
a reproduction light source which irradiates light onto the spatial optical modulation device,
wherein the spatial optical modulation device comprises:
a first substrate;
a first electrode layer formed on the first substrate;
the phase transition layer formed on the first electrode layer;
a liquid crystal layer formed on the phase transition layer;
a second electrode layer formed on the liquid crystal layer; and
a second substrate formed on the second electrode layer.

14. The apparatus of claim 13, wherein the phase transition layer is patterned into a plurality of regions that are separated from one other.

* * * * *